United States Patent [19]

Bailey et al.

[11] 4,098,747

[45] Jul. 4, 1978

[54] POLYURETHANE ADHESIVES HAVING HIGH PEEL STRENGTH AT 70° C

[75] Inventors: Brian Edward Bailey, Redbourn; Anthony John Bunker, Kempston, both of England

[73] Assignee: Interox Chemicals Limited, London, England

[21] Appl. No.: 688,946

[22] Filed: May 24, 1976

[30] Foreign Application Priority Data

Jun. 20, 1975 [GB] United Kingdom ............... 26291/75

[51] Int. Cl.² .......................... C08K 5/15; C08G 18/42
[52] U.S. Cl. ........................... 260/30.4 N; 260/32.6 N; 260/32.8 N; 528/271; 428/425
[58] Field of Search ............... 260/77.5 AN, 77.5 TB, 260/32.8 N, 30.4 N, 32.6 N

[56] References Cited

U.S. PATENT DOCUMENTS

| | | | |
|---|---|---|---|
| 2,801,990 | 8/1957 | Seeger et al. | 260/77.5 TB |
| 3,169,945 | 2/1965 | Hostettler et al. | 260/77.5 AN |
| 3,490,987 | 1/1970 | Bauriedel | 161/190 |
| 3,660,357 | 5/1972 | Kolycheck | 260/77.5 AN |
| 3,660,359 | 5/1972 | Labana | 260/77.5 TB |
| 3,758,631 | 9/1973 | Werner et al. | 260/77.5 AN |
| 3,761,439 | 9/1973 | Ward et al. | 260/32.8 N |
| 3,822,240 | 7/1974 | Schmitt et al. | 260/77.5 TB |
| 3,824,217 | 7/1974 | Barker | 260/77.5 R |
| 3,931,117 | 1/1976 | Leonard | 260/77.5 AN |

*Primary Examiner*—H.S. Cockeram
*Attorney, Agent, or Firm*—Larson, Taylor and Hinds

[57] ABSTRACT

An adhesive composition which comprises a polyurethane comprising (a) units derived from a diisocyanate, (b) units derived from a poly (ε-caprolactone) diol having a hydroxyl value of from 25 to less than 30, and (c) units derived from an alkane diol chain lengthening agent containing at least 2 carbon atoms, the mole ratio of alkane diol:poly (ε-caprolactone) diol being from greater than 0.7:1.0 to less than 1.2:1.0. The adhesive may be used in solid form or dissolved in an organic solvent. The adhesive has improved hot bond strength and is particularly useful for bonding shoe soles to shoe uppers.

15 Claims, No Drawings

POLYURETHANE ADHESIVES HAVING HIGH PEEL STRENGTH AT 70° C

The present invention relates to polyurethanes and more particularly to adhesive compositions comprising polyurethanes derived from poly(ε-caprolactones) and a process for their preparation.

British Pat. No. 1,268,138 describes a solvent-containing adhesive which comprises a hydroxyl-containing polyurethane prepared from a di-isocyanate and a polyester having a molecular weight of more than 2000 by polycondensation of a hydroxy alkane monocarboxylic acid containing at least 5 carbon atoms or by polymerisation of its lactone and a finite amount, up to 0.7 moles of an alkane diol containing at least 4 carbon atoms being used per mol of polyester, as a chain lengthening agent. The polyester may be derived from ε-caprolactone. The only polyester derived from ε-caprolactone which is exemplified has a hydroxyl value of 52.1, that is a molecular weight of about 2150.

British Pat. No. 1338790 describes a solution for use as an adhesive, the solution comprising a polyester urethane which may be produced by reacting together a diisocyanate with a bifunctional polyester having a hydroxyl value of 30 to 100, preferably about 50. The bifunctional polyesters include those derived from ε-caprolactone and of these the polyesters exemplified have hydroxyl values ranging from 45.6 to 54.5, that is, molecular weights ranging from 2460 to 2055.

U.S. Pat. No. 3,660,357 describes polyurethane adhesives prepared from poly(ε-caprolactones) having molecular weights of from 1800 to 2200, that is, hydroxyl values of from 62 to 51.

According to the present invention there is provided an adhesive composition which comprises a polyurethane comprising (a) units derived from a diisocyanate, (b) units derived from a poly(ε-caprolactone) diol having a hydroxyl value of from 25 to less than 30, and (c) units derived from an alkane diol chain lengthening agent containing at least 2 carbon atoms, the mole ratio of alkane diol:poly(ε-caprolactone) diol being from greater than 0.7:1.0 to less than 1.2:1.0.

A hydroxyl value of from 25 to less than 30 for the poly(ε-caprolactone) diol represents a molecular weight range of from 4480 to 3750.

We have found that in general polyurethane adhesives according to the invention tend to have advantageous properties, for example improved high temperature bond strengths, when compared with adhesives comprising polyurethanes prepared from poly(ε-caprolactone) diols having hydroxyl values above 30.

We have found that for the polyurethane adhesive according to the invention to be sufficiently stable in storage it is necessary for the ratio of the moles of the alkane diol to moles of the poly(ε-caprolactone) to be less than 1.2:1.0. Furthermore if this ratio is equal to or less than 0.7 then the adhesive properties of the polyurethane are inferior. Preferably the ratio is in the range of from greater than 0.7:1.0 to 1.0:1.0 and most preferably from 0.8:1.0 to 0.9:1.0.

According to a further embodiment of the present invention there is provided a process for preparing an adhesive composition which comprises a polyurethane by reacting together a diisocyanate, a poly(ε-caprolactone) diol having a hydroxyl value of from 25 to less than 30, and from greater than 0.7 to less than 1.2 moles per mol of the poly(ε-caprolactone) diol of an alkane diol chain lengthening agent containing at least 2 carbon atoms.

Preferably the diisocyanate is added to a mixture of the molten poly(ε-caprolactone) diol and the alkane diol. The reaction is carried out preferably at a temperature of from 100° to 140° C, most preferably 110° C to 130° C and particularly 120° C for a period of from ½ hour to 24 hours and most preferably 1 hour to 10 hours. The resulting polyurethane product is cooled and the resulting solid may be post-cured, if desired, at room temperature for, for example 24 hours. The solid polyurethane product may, if desired, be granulated. If required the polyurethane product may be dissolved in a suitable organic solvent.

The ratio of moles of diisocyanate to the total of the number of moles of poly(ε-caprolactone) diol and moles of alkane diol, that is, the NCO:OH ratio, should be in the range of 0.97:1.0 to 1.04:1.0 and most preferably 1.0:1.0, so that there is no substantial excess of isocyanate nor of terminal hydroxyl groups remaining.

NCO:OH ratios of 1.0:1.0 or greater are generally necessary when the polyurethane is to be used as a single-pack adhesive, that is, one which can be used as such, without the need for further additives before use, so that there is enough isocyanate present to ensure that, in use, sufficient cross-linking occurs for the attainment of adequate bond strengths.

We have found that if the NCO:OH ratio is less than 0.97 then the adhesive properties of the polyurethane tend to be inferior, for example, the ultimate bond strengths attainable are diminished. Generally speaking for ratios of from 0.97:1.0 to less than 1.00:1.00 it is normally necessary to add a trifunctional isocyanate to the polyurethane before use in order to ensure sufficient cross-linking. Thus, the polyurethane forms part of a two component adhesive system. Suitable trifunctional isocyanates are reaction products from alkane triols, particularly trimethylolpropane, and an excess of a diisocyanate, particularly tolylene-di-isocyanates. Suitably 15% to 25% by weight of the trifunctional isocyanate is added, based on the weight of the polyurethane.

If the NCO:OH ratio is greater than 1.04:1.00 then in general the polyurethane tends to have poor solubility in the organic solvents commonly used for polyurethane adhesives.

We have found that when there is any residual or excess isocyanate present in the polyurethane adhesives of this invention, then on storage the polyurethane tends to cross-link to give an intractable insoluble composition which is unsuitable as an adhesive. Even if, in its preparation, the NCO:OH ratio is less than 1.0:1.0, there may still be a trace of residual isocyanate because of incomplete reaction. If the initial NCO:OH ratio used is greater than 1.0:1.0, then, of course, there is necessarily excess isocyanate. With a ratio of 1.04:1.00 then the storage life of the adhesive may be only about one month. Storability is an important consideration because there may be a time lapse of several months between manufacture of the polyurethane adhesive and its use.

We have found that it is possible to improve the storage stability of the polyurethane adhesives of this invention by the addition of an isocyanate blocking agent thereto. By the term "isocyanate blocking agent" is meant a compound which reacts with the residual or excess isocyanate and so prevents or substantially reduces the ability of this isocyanate to cause cross-linking under storage conditions, but which, when the adhesive is heated in use, dissociates from the isocyanate so that the isocyanate is then free to perform its normal function.

According to another embodiment of the present invention, therefore, there is provided an adhesive which comprises a polyurethane as hereinbefore defined and an isocyanate blocking agent as hereinbefore defined.

The isocyanate blocking agent may be selected from lactams, malonates, bisphenols, pyrocatechol and diphenylamine. Preferably a 5 to 7-membered lactam is used, most preferably ε-caprolactam. The blocking agent may be used in an amount of from 0.1 to 10% by weight, preferably .05 to 5.0% by weight, based on the weight of the polyurethane.

The isocyanate blocking agent may be incorporated into the polyurethanes by any convenient means. For example, it may be added to the molten polyurethane shortly after the formation of the latter, or, alternatively it may be mixed with granules of the polyurethane and the mixture worked, for example by milling, at elevated temperature, for example at 80° – 120° C, such that the granules soften sufficiently for the isocyanate blocking agent to be blended in.

In general, we have found that, in use, there is no discernible difference between the ultimate properties of the adhesives of this invention which do contain the isocyanate blocking agent and those which have otherwise identical formulations but do not contain the isocyanate blocking agent. In general, the only difference is that the polyurethane adhesives which do contain the isocyanate blocking agent remain usable for a longer period, that is, have a longer storage life.

The poly(ε-caprolactone) diols suitable for use in this invention are the polyester reaction products of ε-caprolactone and glycols containing from 2 to 10 carbon atoms, for example, ethylene glycol, trimethylene glycol, tetramethylene glycol and hexamethylene glycol or mixtures thereof. Most preferably tetramethylene glycol (butane 1,4 diol) is used. Most preferably the reaction between the glycol and ε-caprolactone is carried out at a temperature not exceeding 160° C, in the presence of a conventional catalyst. We have found that the poly(ε-caprolactone) diol product prepared under these conditions leads to the most advantageous polyurethane adhesives.

The diisocyanates which may be used in the process of this invention include for example 4,4¹-di-isocyanatodiphenyl methane (MDI), tolylene-di-isocyanates particularly dimerised tolylene di-isocyanates, di-isocyanate-dicyclohexylmethane, hexamethylene-di-isocyanate and naphthalene1,5-di-isocyanate. MDI is particularly preferred.

Any alkane diols or mixtures thereof, which contain at least 2 carbon atoms are suitable for use as chain lengthening agents and include for example, ethane-1,2-diol, propane-1,3-diol, butane-1,4-diol, pentane-1,5-diol and hexane-1,6-diol. Butane 1,4-diol is particularly preferred.

The polyurethane adhesives according to this invention may be used in the conventional manner. For example, they may be applied to surfaces to be adhered together from solutions in suitable solvents such as acetone, methyl ethyl ketone, tetrahydrofuran, dioxane or dimethylformamide. Solution in methyl ethyl ketone is preferred. The viscosity of the solution can be adjusted to the particular requirements of the bonding process or to the materials which are bonded by varying the concentration of the polyurethane. The adhesive coated surfaces are preferably heated, for example to about 80° to 90° C, to evaporate the solvent and to activate the adhesive. The surfaces may then be pressed together immediately. Prior to the application of the adhesive solution the surfaces may have been preheated to 80° to 90° C and roughened to prepared in some other way, for example, by wiping with a solvent. Alternatively the polyurethane adhesives may be applied in solid form, for example as a film or tape, and heated, for example to 80° to 90° C, to soften and activate the polyurethane and induce adhesion to the surface.

Generally speaking it is preferred to apply the adhesives from solution.

The polyurethane adhesives of this invention generally have excellent adhesive properties immediately on contact and readily crystallise to form the desired hard but flexible structural adhesive, reaching their initial hardness within 24 minutes of being heat softened.

A number of materials such as for example, paper, cardboard, leather, wood, glass, metal, thermoset and thermoplastic materials, and rubber materials for example natural, synthetic and urethane rubbers, including poromeric rubbers, can be bonded very firmly with the polyurethane adhesives according to the invention. The adhesives are particularly useful for bonding rubber materials, PVC and particularly plasticised PVC, and leather to one another, especially for bonding shoe soles made of these materials to shoe uppers made of leather or of synthetic materials which simulate leather.

Certain embodiments of the present invention will now be illustrated more fully by way of example. Example 5 is a comparative example and is not according to the invention.

EXAMPLE 1

Preparation of Polyurethane Adhesive

The quantities of reactants used and their mole ratios are given in Table 1.

The poly(ε-caprolactone) diol which was used had a hydroxyl value of 27.25 (molecular weight 4010) and was prepared from ε-caprolactone and tetramethylene glycol at a temperature of 160° C. This material is available from Interox Chemicals Limited under the Trade Mark CAPA 240X.

The MDI used was DESMODUR 44 MS (Bayer).

TABLE 1

| Adhesive | MDI % w/w | Poly (ε-caprolactone) diol (Polyol) % w/w | Butane 1,4 diol (B.D) % w/w | Ratio of Moles MDI to Moles (Polyol +B.D.) | Ratio of Moles B.D. to Moles Polyol |
|---|---|---|---|---|---|
| 1 | 10.20 | 88.05 | 1.74 | 0.99 | 0.88 |
| 2 | 10.29 | 87.97 | 1.74 | 1.00 | 0.86 |
| 3 | 10.62 | 87.65 | 1.73 | 1.03 | 0.80 |

The required quantity of poly(ε-caprolactone) diol was placed in a vessel, melted and held at 70° to 80° C. The required quantity of butane diol was mixed in with stirring. The required quantity of MDI in the form of flake was added rapidly with vigorous stirring to give a homogeneous mixture. The mixture was poured into PTFE lined trays preheated to 120° C and the trays were placed in an oven at 120° C for 1 hour. After this 1 hour reaction time the trays, now containing the polyurethane product, were removed from the oven, allowed to cool to room temperature and held at room temperature for 24 hours. The polyurethane product was then removed from the trays and reduced to granules.

The polyurethane reactives 1, 2 and 3 were stable in storage for between one and three months.

EXAMPLE 2

Preparation of Adhesive Solutions (a) One Component Adhesive 15 parts by weight of the polyurethane adhesives 1, 2 and 3 prepared as described above in Example 1 were dissolved in 85 parts by weight of methyl ethyl ketone. These solutions are hereinafter referred to as 1(a), 2(a) and 3(a).

(b) Two Component Adhesives 15 parts by weight of the polyurethane adhesives 1, 2 and 3 prepared as described above in Example 1 were dissolved in 85 parts by weight of methyl ethyl ketone, to which solution was added 3 parts by weight of DESMODUR L (Bayer). DESMODUR L is a triisocyanate compound.

These solutions are hereinafter referred to as 1(b), 2(b) and 3(b).

PROPERTIES OF THE ADHESIVE SOLUTIONS

Bonding tests were carried out using 1 cm wide strips of a 1.25 mm thick PVC coated shoe upper material, comprising a heavy gauge cotton twill fabric base coated with a plasticised, pigmented PVC. Two strips of this material were first prepared by wiping the PVC surface with acetone and a 1 cm length of the surface of each strip was then coated with a thin layer of adhesive solution. The adhesive coated surfaces were heated at 90° ± 5° C under an I.R. lamp for several minutes to evaporate the solvent and soften the polyurethane. The adhesive coated portions of each strip were then pressed together and placed under a 6 kg load for 3 minutes to make the bond.

Peel strength tests were then carried out on the bonds as follows:

(i) Immediate peel strength (green strength). Immediately after the bond had been made as described above, the force required to peel the bond apart was determined.

(ii) 20° C Peel strength. After the bond had been made it was allowed to cure for 24 hours at 20° C and the force required to peel it apart was then determined.

(iii) 70° C peel strength. After the bond had been made it was allowed to cure at 20° C for 24 hours, after which time it was heated at 70° C for 30 minutes and then the force required to peel it apart was determined.

(iv) Creep test. The bond area in this case was 1 inch × 1 inch. After the bond had been made it was allowed to cure at 20° C for 24 hours, after which time it was heated to 70° C and maintained at this temperature whilst a peeling force of 1 kg was applied to it. The time to failure was determined.

The results are given in Table 2.

TABLE 2

| Adhesive Solution | 1(a) | 1(b) | 2(a) | 2(b) | 3(a) | 3(b) |
|---|---|---|---|---|---|---|
| Immediate peel strength (green strength) in kg/cm. | 1.3 | 3.2 | 3.6 | 6.8 | 5.4 | 5.6 |
| 20° C peel strength in kg/cm. | 6.4 | 12.3 | 15.2 | >16 | 6.4 | 19.2 |
| 70° C peel strength in kg/cm. | 0.4 | 0.4 | 2.5 | 15.2 | 2.4 | 7.3 |
| Creep test | — | — | N.M. | N.M. | N.M. | N.M. |

N. M. = no movement in 24 hours

EXAMPLE 3

The procedures of Example 1 were repeated. The granules so obtained were then mixed in a 2-roll mill with 3% by weight of ε-caprolactam, based on the weight of polyurethane, at a temperature of 100° C. After thorough blending the product was removed as anide and granulated.

The three polyurethane adhesive products so obtained were stable in storage for more than six months.

EXAMPLE 4

The procedures of Example 1 were repeated up to and including adding the required quantity of MDI, in the form of flake, rapidly with vigorous stirring to give a homogeneous mixture.

The mixture was then poured into PTFE lined trays preheated to 120° C and the trays were placed in an oven at 120° C for ¾ hour. After this period of reaction, the trays now containing the polyurethane were removed from the oven and 3% by weight ε-caprolactam; based on the weight of the polyurethane, preheated to 80° C was thoroughly mixed in. The trays were placed in an oven at 100° C for 1 hour and then removed and allowed to cool to room temperature and held at room temperature for 24 hours. The polyurethane product was then removed from the trays and reduced to granules.

The three polyurethane adhesive products so obtained were stable in storage for more than 6 months.

EXAMPLE 5

The procedures of Example 1 were repeated but using a poly ε-caprolactone diol having an hydroxyl value of 36.8 (molecular weight 3024). This material is available from Interox Chemicals Limited under the trade name CAPA 230.

The quantity of reactants used and the mole ratios are given below;

|  | wt % | moles |
|---|---|---|
| MDI | 12.68 | 0.051 |
| Poly ε-caprolactone diol | 85.25 | 0.028 |
| Butane 1,4 diol | 2.03 | 0.022 |
| Ratio moles BD/polyol |  | = 0.8 |
| Ratio moles MDI/BD + polyol |  | = 1.02 |

The granulated product obtained was dissolved in methylethyl ketone as described in Example 2(a) and tested as described in Example 2 with the following results:

| Immediate peel strength | Kg/cm | 4.2 |
|---|---|---|
| 20° C peel strength | Kg/cm | >16.0 |
| 70° C peel strength | Kg/cm | 0.3 |

It is readily apparent that the 70° C peel strength is poor when compared with the adhesives according to the invention.

We claim:

1. An adhesive composition having a peel strength at 70° C of at least about 2.4 Kg/cm which comprises a polyurethane comprising (a) units derived from a diisocyanate, (b) units derived from a poly ($\epsilon$-caprolactone) diol having a hydroxyl value of from 25 to less than 30, and (c) units derived from an alkane diol chain lengthening agent containing at least 2 carbon atoms, the mole ratio of alkane diol: poly($\epsilon$-caprolactone) diol being from greater than 0.7:1.0 to less than 1.2:1.0 and the ratio of moles of diisocyanate to the total of the number of moles of poly($\epsilon$-caporlactone) diol and the number of moles of alkane diol in the polyurethane is from 1.0:1.0 to 1.04:1.00.

2. An adhesive composition according to claim 1 wherein the alkane diol is butane 1,4 diol.

3. An adhesive composition according to claim 1 wherein the poly($\epsilon$-caprolactone) diol, from which the said units are derived, is prepared by reacting together in the presence of a catalyst at a temperature not exceeding 160° C, $\epsilon$-caprolactone and a glycol containing from 2 to 10 carbon atoms.

4. An adhesive composition according to claim 3 wherein the glycol is tetramethylene glycol.

5. An adhesive composition according to claim 1 wherein the diisocyanate, from which the said units are derived is 4,4'-di-isocyanato-diphenylmethane.

6. An adhesive composition according to claim 1 which additionally contains an isocyanate blocking agent in an amount of from 0.1% to 10.0% by weight based on the weight of polyurethane.

7. An adhesive composition according to claim 6 wherein the blocking agent is $\epsilon$-caprolactam.

8. An adhesive composition according to claim 1 which additionally contains an organic solvent for the polyurethane, selected from the group consisting of acetone, methyl ethyl ketone, tetrahydrofuran, dioxane and dimethylformamide.

9. An adhesive composition according to claim 8 which additionally contains a trifunctional isocyanate compound present in an amount of from 15% to 25% by weight, on weight of polyurethane.

10. A process for the preparation of an adhesive composition according to claim 1 comprising reacting together, at a temperature of from 100° to 140° C for a period of ½ hour to 24 hours, a diisocyanate, a poly($\epsilon$-caprolactone) diol having a hydroxyl value of from 25 to less than 30, and from greater than 0.7 to less than 1.2 moles per mol of the poly($\epsilon$-caprolactone) diol of an alkane diol chain lengthening agent containing at least 2 carbon atoms.

11. A process according to claim 10 wherein the ratio of moles of diisocyanate to the total of the number of moles of poly($\epsilon$-caprolactone) diol and moles of alkane diol in the polyurethane is from 1.00:1.00 to 1.04:1.00.

12. A process according to claim 10 wherein the alkane diol is butane 1,4 diol.

13. A process according to claim 10 wherein the poly($\epsilon$-caprolactone) diol used is prepared by reacting together in the presence of a catalyst at a temperature not exceeding 160° C, $\epsilon$-caprolactone and a glycol containing from 2 to 10 carbon atoms.

14. A process according to claim 13 wherein the glycol is tetramethylene glycol.

15. A process according to claim 10 wherein the diisocyanate is 4,4'-di-isocyanato-diphenylmethane.

* * * * *